July 6, 1954    G. B. SAUNDERS ET AL    2,683,019
STAKE DRIVING MACHINE
Filed March 10, 1953    4 Sheets-Sheet 1
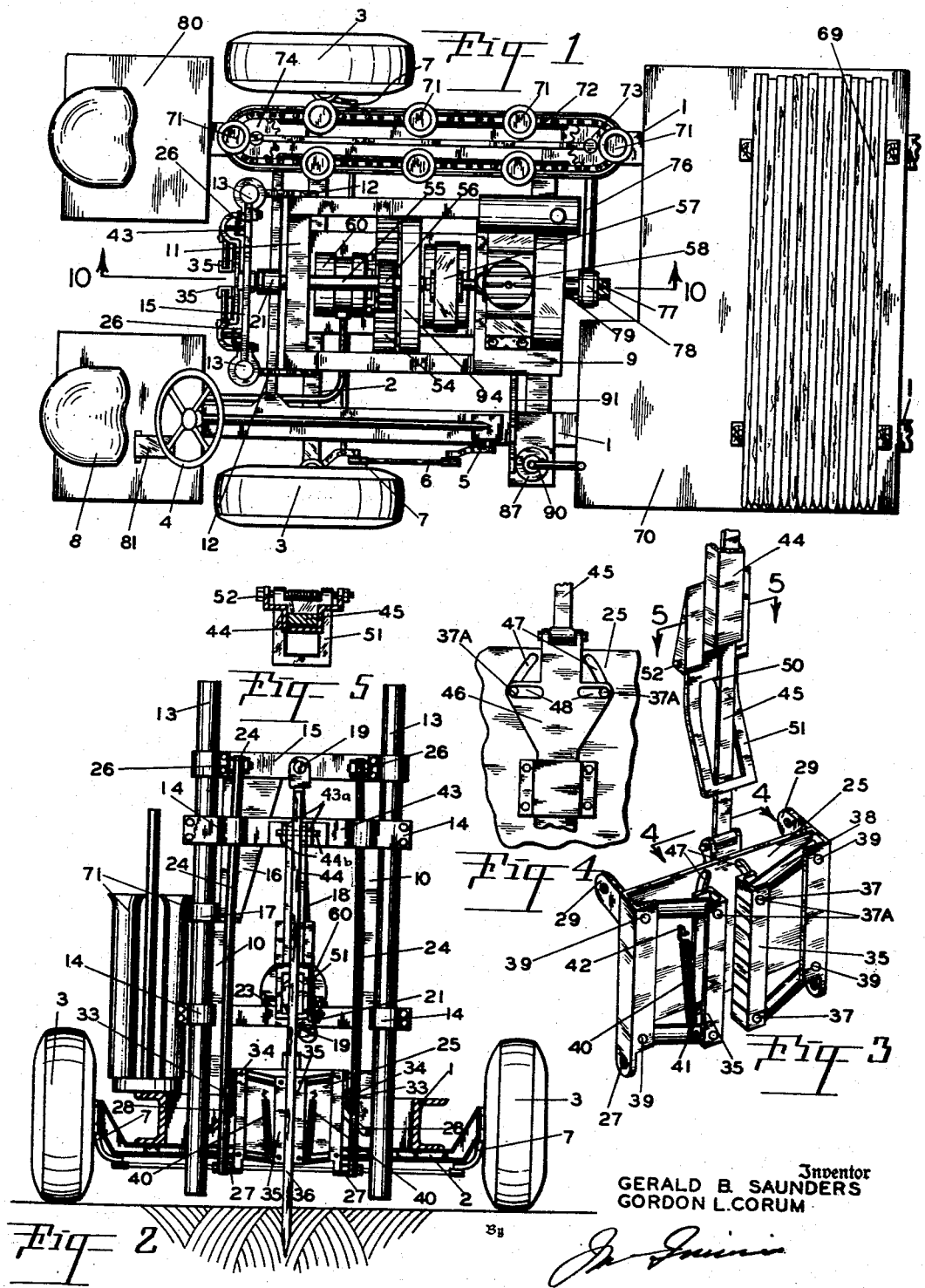
Inventor
GERALD B. SAUNDERS
GORDON L. CORUM
Attorney

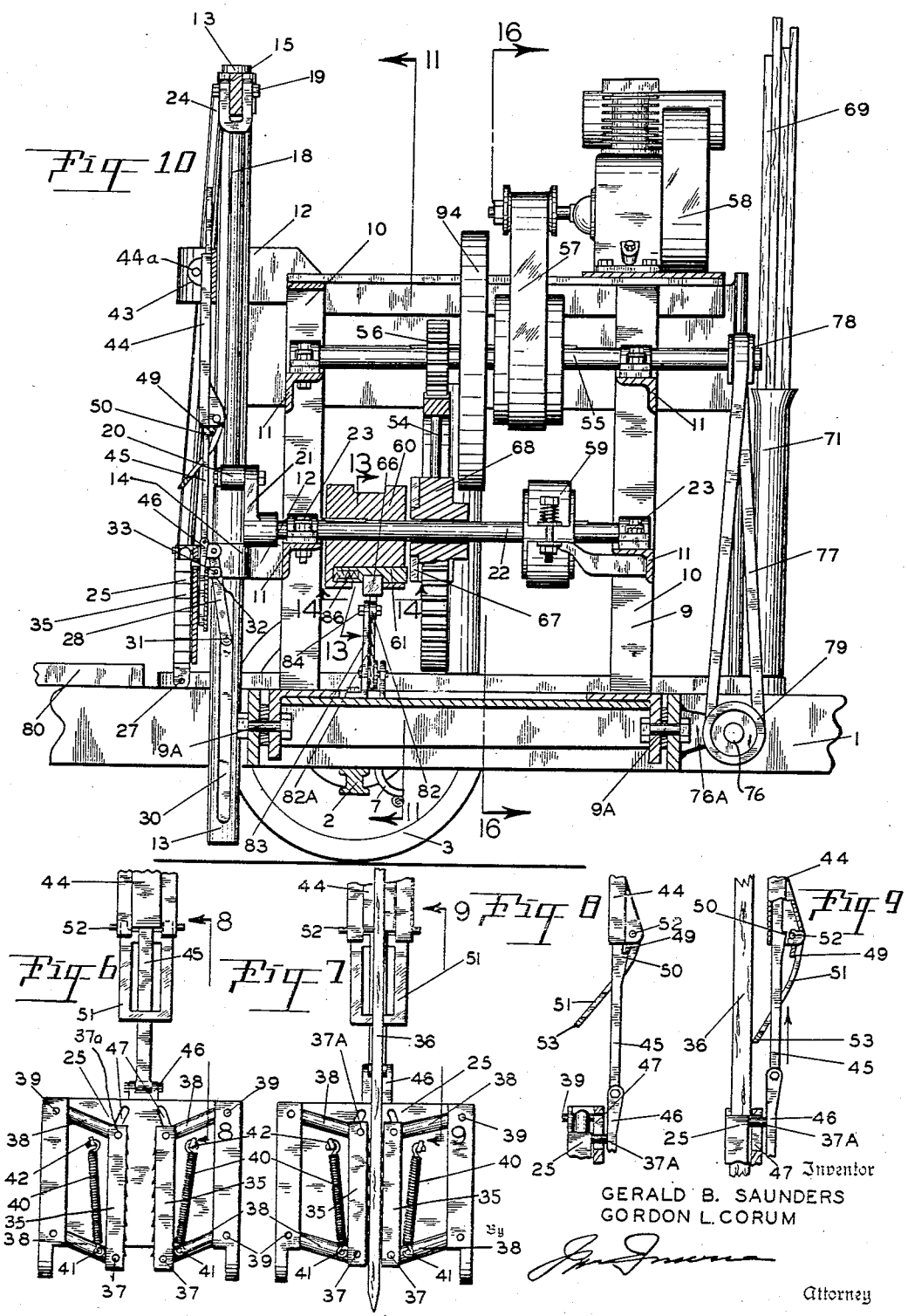

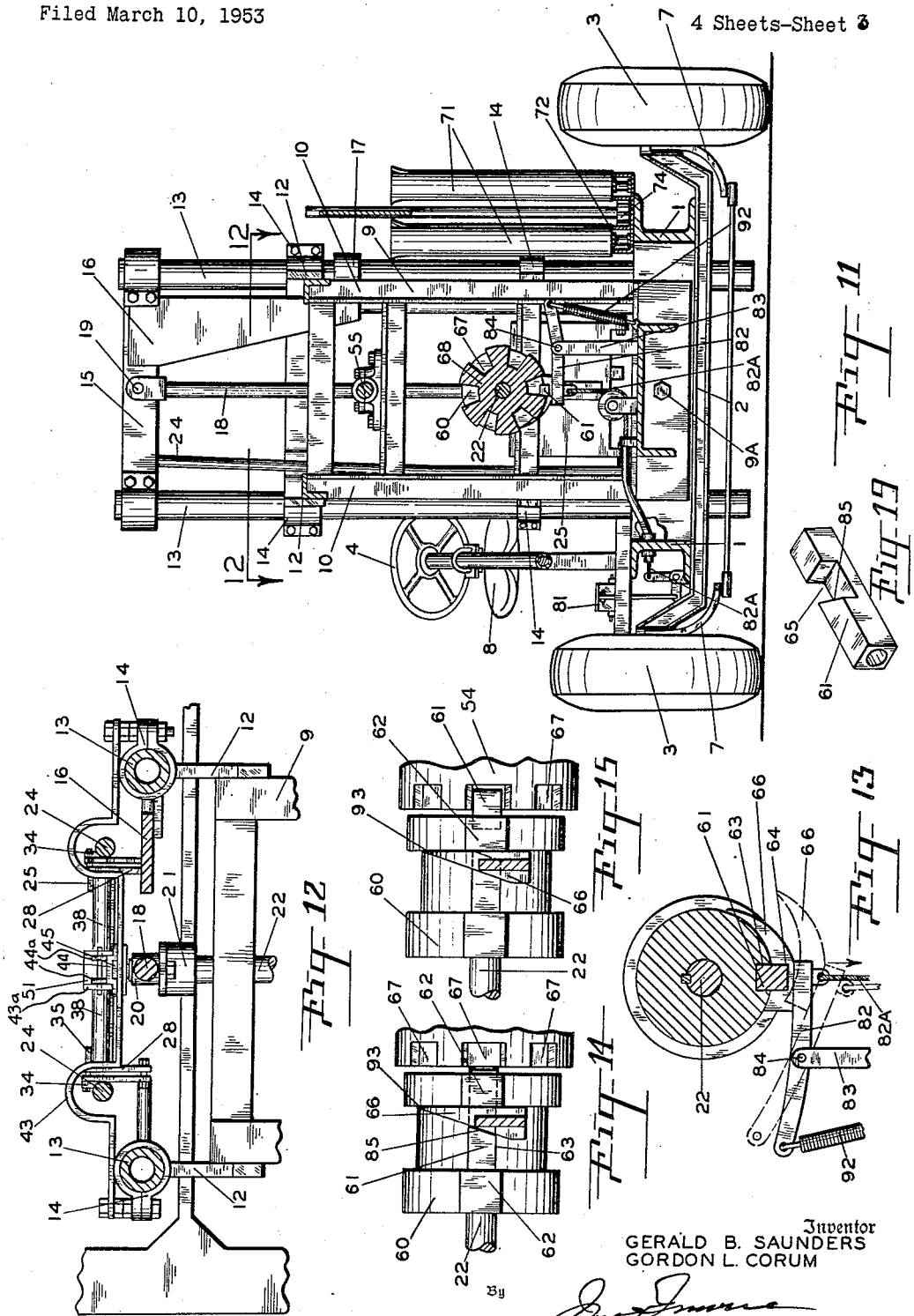

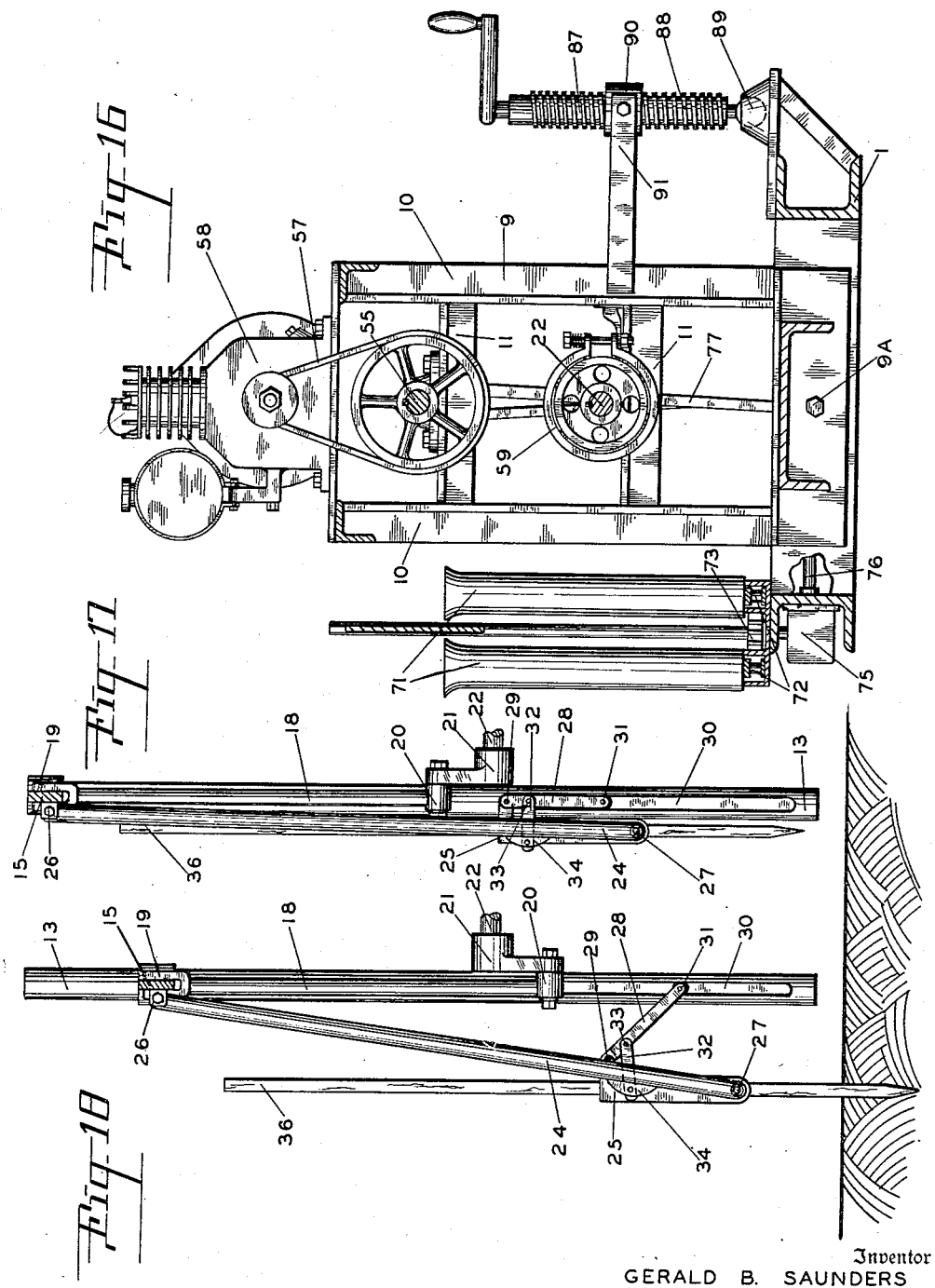

Patented July 6, 1954

2,683,019

UNITED STATES PATENT OFFICE 2,683,019

STAKE DRIVING MACHINE

Gerald B. Saunders and Gordon L. Corum, Eugene, Oreg.

Application March 10, 1953, Serial No. 341,416

4 Claims. (Cl. 254—29)

This invention relates to improvements in stake driving machines that are particularly adapted for the driving of stakes or poles in bean fields and the like, and is a continuation in part of our pending application for Stake Driving Machine, filed November 14, 1950, Serial No. 195,615, now abandoned.

The primary object of the invention is to provide a machine that will drive stakes or bean poles adjacent the bean plants as the machine passes over and along the rows of plants in bean fields and the like.

Another object of the invention is to provide means of allowing the driving head of the machine to remain stationary regarding the forward movement of the machine after the tip of the stake has entered the ground and has been completely driven into the ground.

These and other incidental objects will be apparent in the drawings, specification and claims.

Referring to the drawings:

Figure 1 is a plan view of our new and improved stake driving machine.

Figure 2 is an end view looking into the stake driving head.

Figure 3 is a perspective fragmentary view of the driving head and associated parts.

Figure 4 is a fragmentary rear view, taken on line 4—4 of Figure 3, illustrating the stake holding jaw details.

Figure 5 is a sectional view, taken through line 5—5 of Figure 3.

Figure 6 is a fragmentary front view of the stake driving head showing the jaws in open position.

Figure 7 is the same as Figure 6, except that the stake is in place with the jaws in gripping position.

Figure 8 is a fragmentary view, taken on line 8—8 of Figure 6.

Figure 9 is a view taken on line 9—9 of Figure 7.

Figure 10 is a side sectional view taken on line 10—10 of Figure 1.

Figure 11 is an end sectional view taken on line 11—11 of Figure 10.

Figure 12 is a fragmentary plan sectional view, taken on line 12—12 of Figure 11.

Figure 13 is a fragmentary end sectional view, taken on line 13—13 of Figure 10, illustrating the clutch mechanism.

Figure 14 is a fragmentary detail view of the clutch mechanism, taken on line 14—14 of Figure 10.

Figure 15 is the same as Figure 14, except that the clutch is engaged.

Figure 16 is an end sectional view taken on line 16—16 of Figure 10.

Figure 17 is a fragmentary enlarged detail of the driving head in raised position, parts of the machine omitted for simplicity.

Figure 18 illustrates the driving head in lowered and driving position.

Figure 19 is a perspective view of the clutch locking bolt.

Referring more specifically to the drawings:

Our new and improved stake driving machine consists of a frame 1 mounted upon the axle 2, and wheels 3 are steerably mounted on the axle 2 in the usual manner. The wheels 3 being controlled by the steering wheel 4 operating the crank arm 5, which by means of the connecting link 6 is connected to the steering arms 7 which are associated with the wheels 3. The usual trailer hitch, not here shown, which may be associated with the forward end of the frame 1, is adapted to tow the machine behind a tractor.

The steering of the machine by the steering wheel 4 is accomplished relative to the row by an operator seated on the seat 8, behind the steering wheel 4. This operator controls the operation of the stake driving head by a clutch mechanism which will be later described.

Mounted upon the frame 1 is a box-like frame 9, consisting of oppositely aligned vertical members 10 which are connected in fixed relation to each other by means of cross members 11. Brackets 12 extend rearwardly from the frame assembly 9 and are adapted to support the vertical tubular guides 13. These guides are clamped to the brackets 12 by the clamping collars 14, and thus form a part of the frame 9. A cross head 15 is slidably mounted to the vertical guides 13, best illustrated in Figures 2, 11 and 18. The cross head 15 is stabilized by the downwardly extending arm 16, which is slidably mounted on one of the vertical guides 13 by the bearing 17.

The vertical movement of the cross head 15 is controlled by the connecting rod 18, which is pivotally connected at its upper end to the cross head 15 by means of the wrist pin 19 and at its lower end to the crank pin 20 which is associated with the crank 21. The crank 21 is keyed to the horizontal shaft 22, which is journalled within the bearings 23. The bearings 23 being mounted on the cross members 11 of the frame 9, as best shown in Figure 10.

Suspended from the cross head 15 by means of the connecting rods 24 is a driving head 25. The upper ends of the connecting rods 24 are pivotally connected at 26 to the cross head 15, while the lower ends are pivotally connected to the driving head 25 at 27. The driving head is maintained in a vertical position by links 28, which are pivotally connected to the driving head at 29 at their one end, and their opposite ends are guided within the guide ways 30 formed within the vertical tubular guides 13 by means of the rollers 31.

Links 32 are pivoted at one of their ends to the links 28 as at 33 and their opposite ends are pivoted to the brackets 34, forming part of the connecting rods 24 best illustrated in Figure 18. The object of this linkage will be more fully understood later on in the description of the operation of the machine.

The driving head 25 has a pair of oppositely disposed parallelly mounted jaws 35 adapted to embrace the stake 36 to be driven into the ground. The jaws 35 are pivotally mounted at 37 to the parallel links 38, which are pivotally mounted at 39 to the driving head. Springs 40 are connected to the lower parallel bars at 41 at their one end, and to the driving head 25 at 42 at their opposite end. This tends to maintain the jaws in their raised and closed position as illustrated in Figures 2 and 7.

Fixedly mounted to the brackets 12 is a stationary cross member 43 and centrally of its ends has a pair of opposed L-shaped brackets 43a fixed thereto. A vertical channel bar 44, having a pair of aligned apertured ears 44a adjacent its upper end, is pivotally connected to the cross member 43 by means of a pivot pin 44b which passes through the brackets 43a of the cross member and the apertured ears 44a of the channel bar 44. A trigger bar 45 is mounted for vertical movement within the channel bar 44 as best illustrated in Figures 2, 3, 5, 6, 7, 8 and 9. The lower end of the trigger bar 45 is connected to the cam plate 46, as best illustrated in Figure 4. The pivot pins 37A pass through the angularly disposed slots 47 of the driving head and also register with the transverse slots 48 within the cam plate 46. When the cam plate 46 is lowered it will open the jaws 35 due to the manipulation of the parallel bars 38 in relation to the cam slots 47. The springs 40 normally hold the jaws in raised and closed position, to grip the stake 36 due to the angle of the parallel bars 38 sloping downward towards the jaws. Thus when the stake is driven the jaws will tighten against the said stake preventing slipping of the jaws in holding the stake.

When the driving head has been lowered driving the stake into the ground the crank will raise the same, and as it does the dog 49 will engage the ratchet 50 forming part of the trigger bar 45. This will hold the trigger bar from raising further, thereby stopping the travel of the cam plate 46. This will prevent the jaws 35 from raising further due to the fact that the cross slots 48 of the cam plate 46 will hold the pivot 37A of the parallel bars 38 from moving further up, thereby overcoming the tension of the springs 40, permitting the jaws to open, as best illustrated in Figures 3, 4, 6, 7, 8 and 9. The dog 49 forms part of the lever 51, which is pivotally mounted at 52 to stationary channel bar 44. As the stake 36 is forced against the end 53 of the lever 51, as in Figure 9, it will trip the dog 49 from the ratchet 50, permitting the springs 40 to close the jaws 35 against the stake. We will return to this operation later.

The shaft 22 is driven through a clutch assembly of any suitable design as illustrated particularly in Figures 10, 11, 12, 13, 14 and 15. A spur gear 54 is rotatably mounted upon the shaft 22 and is driven by the countershaft 55 by means of the spur gear 56, belt 57 and the motor 58, the spur gear being constantly rotated by the above driving system.

The shaft 22 is normally retarded in its rotation by the action of the adjustable brake assembly 59 so that the crank 21 will normally be held in a raised vertical position, holding the driving head 25 in its uppermost position. A drum 60 is keyed to the shaft 22 and has a locking bolt 61 slidably positioned longitudinally of said drum through the guideways 62.

The locking bolt 61 also operates in a longitudinal groove 63 and extends out and beyond the drum as indicated at 64, Figure 13. The locking bolt also has a cutaway portion 65 adapted to receive an operating cam 66, best illustrated in Figures 13, 14 and 15. When the cam 66 is in the position illustrated in Figures 13 and 14 the locking bolt will be withdrawn from the bolt receiving notches 67 formed in the hub 68 of the spur gear 54, permitting the spur gear to rotate without revolving the shaft 22 through the drum 60. The bolt 61 is released from the spur gear 54 by the cam 66 when the crank shaft 21 reaches the position illustrated in Figure 10, so that the driving head 25 will remain in its full raised position ready for the placing of a stake within the jaws 35.

We will now describe the operation of the driving of the stakes. A supply of stakes 69 is stacked upon the platform 70. An operator stands on the said platform and transfers the stakes into containers 71, which are fixedly secured and mounted to the chain 72. The chain 72 is trained about the driving sprocket 73 and the idler sprocket 74, best illustrated in Figures 1, 11 and 16. The chain 72 is driven through a gear box 75, Figure 16, drive shaft 76, belt 77 by means of the V-pulleys 78 keyed to the idler shaft 55 and the pulley 79 keyed to the shaft 76, which is journalled within an inboard bearing 76A.

The speed of the chain 72 is relatively slow so as the operator places the stakes 69 within the containers 71 they will be carried to the position of the operator seated on the platform 80. The operator places them one at a time between the jaws 35 and as he does the stake will push the lever 51 as illustrated in Figure 9, unlocking the dog 49 from the ratchet 50 permitting the springs 40 to close the jaws against the stake.

The operator seated on the seat 8, who is maneuvering the position of the machine relative to the row of plants, will then step on the pedal 81 when the driving head is in the proper position over the plant. This will pivot the bar 82, which is pivotally mounted to the machine by way of the bracket 83 at 84, pulling the same to the broken line position illustrated in Figure 13 by way of the cable 82A, removing the cam 66 from behind the edge 85 of the locking bolt 61 allowing the said bolt to enter one of the bolt receiving openings 67, the bolt being forced into this position by the spring 86, referring to Figure 10. This will rotate the clutch drum 60, together with the shaft 22 causing the crank 21 to lower the driving head 25 by way of the connecting rod 18, driving the stake into the ground adjacent the plant as illustrated in Figures 2, 17 and 18.

When the stake hits the ground, which it is about to do in Figure 17, the head 25 will be travelling in a vertical direction downward. When the stake enters the ground the machine will be travelling forward, but as the stake is being driven the ground will be holding the same stationary, which is permitted by the action of the links 28 operating in the guideways 30 of the vetically mounted tubular guides 13. The links 32 maintaining the driving head in a vertical position.

When the crank reaches its lowermost position, as it is about to do in Figures 2 and 18, and begins to raise, the head will be raised slacking off the compression of the jaws against the stake, which will permit the jaws to be pulled sidewise away from the stake in the direction that the machine is travelling, after which the head will be raised by the crank. The connecting rods 24 and the head 25 will take the position illustrated in Figure 17 by gravity or by the assistance of a spring or counterweight not here shown.

When the driving head reaches its uppermost position the ratchet 50 will engage the dog 49, Figures 6 and 8, stopping the travel of the trigger bar 45 and the cam plate 46, thereby opening the jaws so that another stake can be inserted therein by the operator seated on the platform 80. As stated above, when the stake strikes the lever 51 at 53 on inserting the same between the jaws, it will disengage the dog 49 from the notch 50 in the trigger bar 45 allowing the trigger bar 45 to raise by the action of the springs 40 raising the jaws 35 and their associated parallel bars 38, gripping the stake firmly, as best seen in Figure 7.

As the driving head 25 travels down the jaws 35 drive the stake in the ground, and as the machine works forward the jaws 35 are pulled away from the stake and as the driving head 25 is raised the trigger bar 45 slides up within the channel bar 44, and at the uppermost position of the driving head in its upward travel the notch 50 engages the dog 49 of the trigger 51, holding the jaws 35 from going further up while the driving head 25 progresses a slight amount, which opens the jaws 35 by the action of the inclined slots 47 forcing the jaws 35 apart, at which time the trigger 51 holds the jaws 35 apart until a new stake is in position to engage and release the jaws 35, after the new stake is in position the jaws 35 will again close and grip the new stake.

We have provided means of levelling the frame 9, together with the driving head assembly by the screw adjustment jack 87. The threaded bolt 88 has its lower end pivotally mounted at 89 to the frame 1 of the machine. Threaded thereon is a nut 90, which is pivotally connected to the bracket 91 of the framework 9. This will tilt the frame 9 about its longitudinal pivot mountings 9A to vertical position even though the frame 1 may be on a hillside at an angle to the vertical.

Referring back to the clutch assembly, the pedal 81 was only momentarily operated. Referring to Figure 13, the spring 92 returning the cam 66 to the position shown in Figures 10, 11, 13 and 14 by way of the lever 82 so that as the drum 60 revolves the point 93 of the cam will engage the surface 85 of the bolt forcing the same to the position illustrated in Figure 14, releasing the said bolt from the notches 67 of the spur gear 54 stopping the crank in its uppermost position, the same being held there by the action of the brake assembly 59.

A flywheel 94 is keyed to the countershaft 55 and assists in the rotation of the crank 21 under heavy load in the driving of the stake. We do not wish to claim any detail regarding the clutch assembly, as we are employing a well known principle as used in punch presses and the like.

The motor 58 continually drives the countershaft 55 and the spur gear 54, the shaft 22 and crank 21 being rotated one revolution at a time by a one revolution type of clutch. The operator seated on the seat 8 engaging the said clutch after a stake has been placed between the jaws 35 of the driving head 25, the driving head driving the said stake adjacent the plant. When the stake enters the ground the movement forward of the said driving head will be arrested until the stake has been driven its predetermined depth, at which time the jaws of the head will be released allowing the head to be raised, and return to the position shown in Figure 17.

While the invention describes our desired embodiment of the invention, the principles involved are susceptible of numerous other applications that will readily occur to persons skilled in the art and should therefore only be limited by the scope of the appended claims.

Having thus described the various features of the invention what is claimed as new and desired to be secured by Letters Patent is:

What we claim is:

1. In a stake driving machine, a main frame, a driving head, means for mounting said driving head for reciprocal movement on the front of said main frame so that said driving head is adapted to be advanced with the frame and raised and lowered, said mounting means including vertically disposed means for guiding the driving head during the raising and lowering thereof, link means connected to the guide means and the driving head to retain the driving head in vertical position and said links cooperating with said guide means to permit the engagement of the ground with a stake to hold the stake and head stationary with respect to the advance of the frame during the driving of the stake, a crank, a shaft rotatably mounted on said main frame and connected to said crank, said crank being connected to the means for mounting said driving head for reciprocating said driving head, drive means mounted on said main frame, means connecting said drive means to said shaft for intermittently rotating said shaft and crank, and said intermittent rotation reciprocating said driving head to drive a stake, means mounted on said shaft for retarding the rotation of said shaft and crank to normally retain the crank and driving head in raised position, resiliently biased means mounted on the driving head to grip the stake, means on said driving head coacting with said last means to release said means from the stake upon the raising of the driving head for the insertion of another stake to be driven and when said releasing means becomes inactive upon said driving head reaching the end of the upward movement thereof said resiliently biased means will grip the said another stake to drive the same into the ground upon the lowering of said driving head.

2. A stake driving machine as defined in claim 1, wherein the main frame is supported on wheels to be drawn by a tractor or other towing devices and having independent means for steering the same, and means is provided for adjusting the means for mounting said driving head relative to the main frame to dispose the stake in a vertical position.

3. A stake driving machine as defined in claim 1, wherein the means for mounting said driving head further includes a cross head movable in the vertically disposed means for guiding the driving head, said driving head being swingingly suspended from the said cross head and movable toward and away from the said vertically disposed means, and said resiliently biased means includes a pair of coacting jaws, and a coil spring connected between each jaw and said driving head for the biasing of said jaws.

4. A stake driving machine as defined in claim 1, wherein means is provided for adjusting the vertically disposed means for guiding the driving head and stake so as to insure a vertical position for said vertically disposed means regardless of angular variations of said frame.

References Cited in the file of this patent

UNITED STATES PATENTS

| Number | Name | Date |
|---|---|---|
| 2,551,896 | Notestein | May 8, 1951 |